United States Patent
Kimoto et al.

(10) Patent No.: US 11,408,550 B2
(45) Date of Patent: Aug. 9, 2022

(54) THREADED CONNECTION FOR OIL COUNTRY TUBULAR GOODS AND METHOD FOR PRODUCING THREADED CONNECTION FOR OIL COUNTRY TUBULAR GOODS

(71) Applicants: Nippon Steel Corporation, Tokyo (JP); Vallourec Oil and Gas France, Aulnoye-Aymeries (FR)

(72) Inventors: Masanari Kimoto, Tokyo (JP); Masahiro Oshima, Tokyo (JP)

(73) Assignees: Nippon Steel Corporation, Tokyo (JP); Vallourec Oil and Gas France, Aulnoye-Aymeries (FR)

( * ) Notice: Subject to any disclaimer, the term of this patent is extended or adjusted under 35 U.S.C. 154(b) by 263 days.

(21) Appl. No.: 16/613,525

(22) PCT Filed: May 10, 2018

(86) PCT No.: PCT/JP2018/018035
§ 371 (c)(1),
(2) Date: Nov. 14, 2019

(87) PCT Pub. No.: WO2018/216475
PCT Pub. Date: Nov. 29, 2018

(65) Prior Publication Data
US 2020/0072405 A1    Mar. 5, 2020

(30) Foreign Application Priority Data

May 22, 2017 (JP) .............................. JP2017-100502

(51) Int. Cl.
*F16L 58/08*    (2006.01)
*C23C 22/30*    (2006.01)
(Continued)

(52) U.S. Cl.
CPC .............. *F16L 58/08* (2013.01); *C23C 22/30* (2013.01); *C23C 22/77* (2013.01); *C23C 28/021* (2013.01);
(Continued)

(58) Field of Classification Search
None
See application file for complete search history.

(56) References Cited

U.S. PATENT DOCUMENTS

2018/0274703 A1* 9/2018 Goto ........................ C08K 3/04

FOREIGN PATENT DOCUMENTS

JP    S57-092762 U    6/1982
JP    S58-081978 A    5/1983
(Continued)

OTHER PUBLICATIONS

English translation of JP 2007277640 A (Year: 2007).*
(Continued)

*Primary Examiner* — Wojciech Haske
(74) *Attorney, Agent, or Firm* — Banner & Witcoff, Ltd.

(57) ABSTRACT

This invention provides a threaded connection for oil country tubular goods that exhibits excellent corrosion resistance and galling resistance, and a method for producing the threaded connection for oil country tubular goods. The method includes a Zn—Ni alloy plating layer formation step of forming a Zn—Ni alloy plating layer, and a chromate coating formation step of forming a chromate coating after the Zn—Ni alloy plating layer formation step. The chromate coating formation step includes a chromate treatment step and a drying step. The chromate coating formation step satisfy one or more conditions selected from the following conditions 1 to 3.
Condition 1: stirring speed of the chromating solution in the chromate treatment step: a linear speed of 0.5 m/s or more;
(Continued)

Condition 2: chromate treatment time in the chromate treatment step: less than 50 seconds; and
Condition 3: drying temperature in the drying step: 60° C. or less.

8 Claims, 9 Drawing Sheets

(51) Int. Cl.
*C25D 3/22* (2006.01)
*C23C 22/77* (2006.01)
*C23C 28/02* (2006.01)
*C25D 7/04* (2006.01)
*F16L 15/00* (2006.01)
C22C 18/00 (2006.01)
C22C 38/00 (2006.01)
C22C 38/02 (2006.01)
C22C 38/04 (2006.01)
C22C 38/42 (2006.01)
C22C 38/44 (2006.01)

(52) U.S. Cl.
CPC ............... *C25D 3/22* (2013.01); *C25D 7/04* (2013.01); *F16L 15/006* (2013.01); C22C 18/00 (2013.01); C22C 38/002 (2013.01); C22C 38/02 (2013.01); C22C 38/04 (2013.01); C22C 38/42 (2013.01); C22C 38/44 (2013.01); C23C 2222/10 (2013.01)

(56) References Cited

FOREIGN PATENT DOCUMENTS

| | | |
|---|---|---|
| JP | H10-212587 A | 8/1998 |
| JP | 2003-074763 A | 3/2003 |
| JP | 2007-277640 A | 10/2007 |
| JP | 2008-215473 A | 9/2008 |
| WO | 2016170037 A1 | 10/2016 |
| WO | 2017-047722 A1 | 3/2017 |

OTHER PUBLICATIONS

English Abstract of JPA2008215473.
English Abstract of JPA2003074763.
Jul. 3, 2018 (WO) International Search Report Application No. PCT/JP2018/018035.

\* cited by examiner

THREADED CONNECTION FOR OIL COUNTRY TUBULAR GOODS AND METHOD FOR PRODUCING THREADED CONNECTION FOR OIL COUNTRY TUBULAR GOODS

TECHNICAL FIELD

The present invention relates to a threaded connection for oil country tubular goods and a method for producing the threaded connection for oil country tubular goods.

BACKGROUND ART

Oil country tubular goods are used for drilling in oil fields and natural gas fields. Oil country tubular goods are formed by connecting a plurality of steel pipes in accordance with the depth of the well. Connection of the steel pipes is achieved by fastening together threaded connections for oil country tubular goods that are formed at the ends of the steel pipes. Oil country tubular goods are lifted and loosened for inspection and the like, and are then refastened after being inspected, and reused.

A threaded connection for oil country tubular goods includes a pin and a box. The pin includes a male threaded portion formed in the outer peripheral surface at a tip end portion of the steel pipe. The box includes a female threaded portion formed in the inner peripheral surface at a tip end portion of the steel pipe. The pin and the box may include an unthreaded metal contact portions. Each unthreaded metal contact portion includes a metal seal portion and a shoulder portion. When the steel pipes are fastened together, the male threaded portion and the female threaded portion come into contact with each other, the metal seal portions come into contact with each other, and also the shoulder portions come into contact with each other.

The threaded portions and unthreaded metal contact portions of the pin and the box repeatedly experience strong friction during fastening and loosening of the steel pipes. If these portions are not sufficiently resistant to friction, galling (uncorrectable galling) will occur during repeated fastening and loosening. Therefore, it is necessary for threaded connections for oil country tubular goods to have sufficient resistance to friction, i.e., excellent galling resistance.

Heretofore, heavy metal-containing compound greases have been used to improve the galling resistance. Application of a compound grease to the surface of a threaded connection for oil country tubular goods can improve the galling resistance of the threaded connection for oil country tubular goods. However, heavy metals contained in compound greases, such as Pb, may affect the environment. For this reason, the practical application of a compound grease-free threaded connection for oil country tubular goods is desired.

Threaded connections for oil country tubular goods have been proposed which, instead of compound grease, use a grease (referred to as "green dope") which does not contain a heavy metal. For example, in Japanese Patent Application Publication 2008-215473A (Patent Literature 1) and Japanese Patent Application Publication 2003-074763A (Patent Literature 2), threaded connections for oil country tubular goods are described that are excellent in galling resistance even though these threaded connections use grease that does not contain a heavy metal.

A threaded connection for oil country tubular goods that is described in Patent Literature 1 is a threaded connection for oil country tubular goods that is composed of a pin and a box that each include a contact surface having a threaded portion and an unthreaded metal contact portion. A characteristic of the threaded connection for oil country tubular goods described in Patent Literature 1 is that at least one of the contact surfaces of the pin and the box has a first plating layer composed of a Cu—Zn alloy. It is described in Patent Literature 1 that, as a result, in a case where a green dope is applied, and also even in the case of where the threaded connection is dope-free, the threaded connection exhibits sufficient leakage resistance and galling resistance, and is also excellent in corrosion resistance, and the occurrence of crevice corrosion is prevented even if green dope or a lubricant coating is present on the plating layer.

According to the technology disclosed in Patent Literature 1, by forming a specific alloy plating layer on a contact surface, galling resistance is improved even when using a green dope.

A joint for oil country tubular goods described in Patent Literature 2 is a joint for oil well steel pipes that is formed from a pin portion having a male thread and a metal-metal seal portion at one end of a steel pipe that contains Cr in an amount of 9 mass % or more, and a coupling that is made of the same material as the steel pipe that the pin portion is formed and is provided with box portions each having a female thread and a metal-metal seal portion at both ends of a steel pipe. A feature of the joint for oil country tubular goods is that a Cu—Sn alloy layer is formed as a single layer on the surface of the female thread and the metal-metal seal portion of the coupling. Patent Literature 2 describes that, as a result, even when a green dope is used, the sealing ability is better than in the conventional joints for oil country tubular goods, and the occurrence of galling at the joint can be markedly suppressed.

CITATION LIST

Patent Literature

Patent Literature 1: Japanese Patent Application Publication 2008-215473A
Patent Literature 2: Japanese Patent Application Publication 2003-074763A

SUMMARY OF INVENTION

Technical Problem

In this connection, oil country tubular goods are transported by ship or by other means after production, and stored for a certain period of time before being used. In some cases, the transport and storage of oil country tubular goods extend for a long time. Furthermore, in some cases, oil country tubular goods are stored in an outdoor location. When oil country tubular goods are stored in an outdoor location for a long period of time, white rust may sometimes occur on the threaded connections for oil country tubular goods, which can result in decreased galling resistance and sealability of the threaded connections for oil country tubular goods.

When using the compositions for forming the threaded connections for oil country tubular goods and a lubricant coating disclosed in Patent Literature 1 and Patent Literature 2, when stored outdoors for a long period of time, white rust sometimes occurs on the threaded connections for oil country tubular goods, and corrosion resistance decreases. In addition, in such a case, the sealability and the galling resistance of the threaded connections for oil country tubular goods sometimes decrease.

An objective of the present invention is to provide a threaded connection for oil country tubular goods that exhibits excellent corrosion resistance, and a method for producing the threaded connection for oil country tubular goods that exhibits excellent corrosion resistance.

Solution to Problem

A production method of the present embodiment is a method for producing a threaded connection for oil country tubular goods. The threaded connection for oil country tubular goods includes a pin and a box. The pin includes a pin-side contact surface that includes a pin-side threaded portion. The box includes a box-side contact surface that includes a box-side threaded portion. The method for producing the threaded connection for oil country tubular goods includes a Zn—Ni alloy plating layer formation step and a chromate coating formation step after the Zn—Ni alloy plating layer formation step. In the Zn—Ni alloy plating layer formation step, at least one of the pin-side contact surface and the box-side contact surface is immersed in a plating solution containing zinc ions and nickel ions, and a Zn—Ni alloy plating layer is formed on at least one of the pin-side contact surface and the box-side contact surface by electroplating. The Zn—Ni alloy plating layer is consisting of a Zn—Ni alloy and impurities. In the chromate coating formation step, a chromate coating is formed on the Zn—Ni alloy plating layer. The chromate coating formation step includes a chromate treatment step and a drying step after the chromate treatment step. In the chromate treatment step, the pin-side contact surface and/or the box-side contact surface having the Zn—Ni alloy plating layer formed thereon is immersed in a chromating solution containing chromium ions to perform a chromate treatment. In the drying step, a drying treatment is performed on the pin-side contact surface and/or the box-side contact surface. In the chromate coating formation step, one or more conditions selected from condition 1 to condition 3 hereunder is satisfied:

Condition 1: Stirring speed of the chromating solution in the chromate treatment step: linear speed of 0.5 m/s or more;
Condition 2: Chromate treatment time in chromate treatment step: less than 50 seconds; and
Condition 3: Drying temperature in drying step: 60° C. or less.

A threaded connection for oil country tubular goods of the present embodiment includes a pin, a box, a Zn—Ni alloy plating layer and a chromate coating. The pin includes a pin-side contact surface including a pin-side threaded portion. The box includes a box-side contact surface including a box-side threaded portion. The Zn—Ni alloy plating layer is formed on at least one of the pin-side contact surface and the box-side contact surface. The Zn—Ni alloy plating layer is consisting of a Zn—Ni alloy and impurities. A chromate coating is formed on the Zn—Ni alloy plating layer. A lightness L value of the chromate coating surface is less than 65.

Advantageous Effects of Invention

The threaded connection for oil country tubular goods of the present embodiment exhibits excellent corrosion resistance.

DESCRIPTION OF EMBODIMENTS

The present embodiment will be described in detail below with reference to the drawings. The same reference symbols will be used throughout the drawings to refer to the same or like parts, and description thereof will not be repeated.

The present inventors conducted various studies regarding corrosion resistance and surface treatment on contact surfaces of a threaded connection for oil country tubular goods. As a result, the present inventors obtained the following findings.

The hardness and melting point of zinc (Zn) is low in comparison to copper (Cu) which is an element that has been used in conventional plating layers. However, a Zn—Ni alloy that is a Zn alloy has a sufficiently high hardness and high melting point. Accordingly, when a Zn—Ni alloy is used to form a plating layer, the galling resistance of a threaded connection for oil country tubular goods can be increased. In the present description, a plating layer consisting of a Zn—Ni alloy and impurities is referred to as a "Zn—Ni alloy plating layer".

Chromate treatment is available as a technique for inhibiting the occurrence of white rust. In the past, chromating solutions have contained hexavalent chromium. However, there is a possibility that hexavalent chromium may affect the environment. Therefore, it was desired to develop a so-called "trivalent chromate treatment" which does not contain hexavalent chromium. A trivalent chromate treatment is performed using, for example, as a commercial product, DAIN Chromate TR-02 (trade name) manufactured by Daiwa Fine Chemicals Co., Ltd. Hereunder, in the present description, unless specifically stated otherwise, the term "chromate treatment" means a trivalent chromate treatment.

However, it has been found that, in a threaded connection for oil country tubular goods, even if a chromate treatment is performed on Zn—Ni alloy plating, in some cases white rust occurs in a shorter time than expected.

The present inventors discovered as a result of their studies that a lightness L value of a chromate coating surface can be used as an index of corrosion resistance.

The corrosion resistance of a threaded connection for oil country tubular goods can be determined based on the area ratio of white rust that occurs on the surface of the threaded connection for oil country tubular goods (hereunder, referred to as "white rust occurrence area ratio"). In the present embodiment, if the white rust occurrence area ratio after 300 hours of a salt spray test (SST) is less than 50%, the threaded connection for oil country tubular goods in question is determined as being excellent in corrosion resistance. The salt spray test and the white rust occurrence area ratio are described in detail in an example that is described later. Hereinafter, in the present description, unless specifically stated otherwise, the term "white rust occurrence area ratio" means "white rust occurrence area ratio after 300 hours of a salt spray test (SST)".

Figure 1:
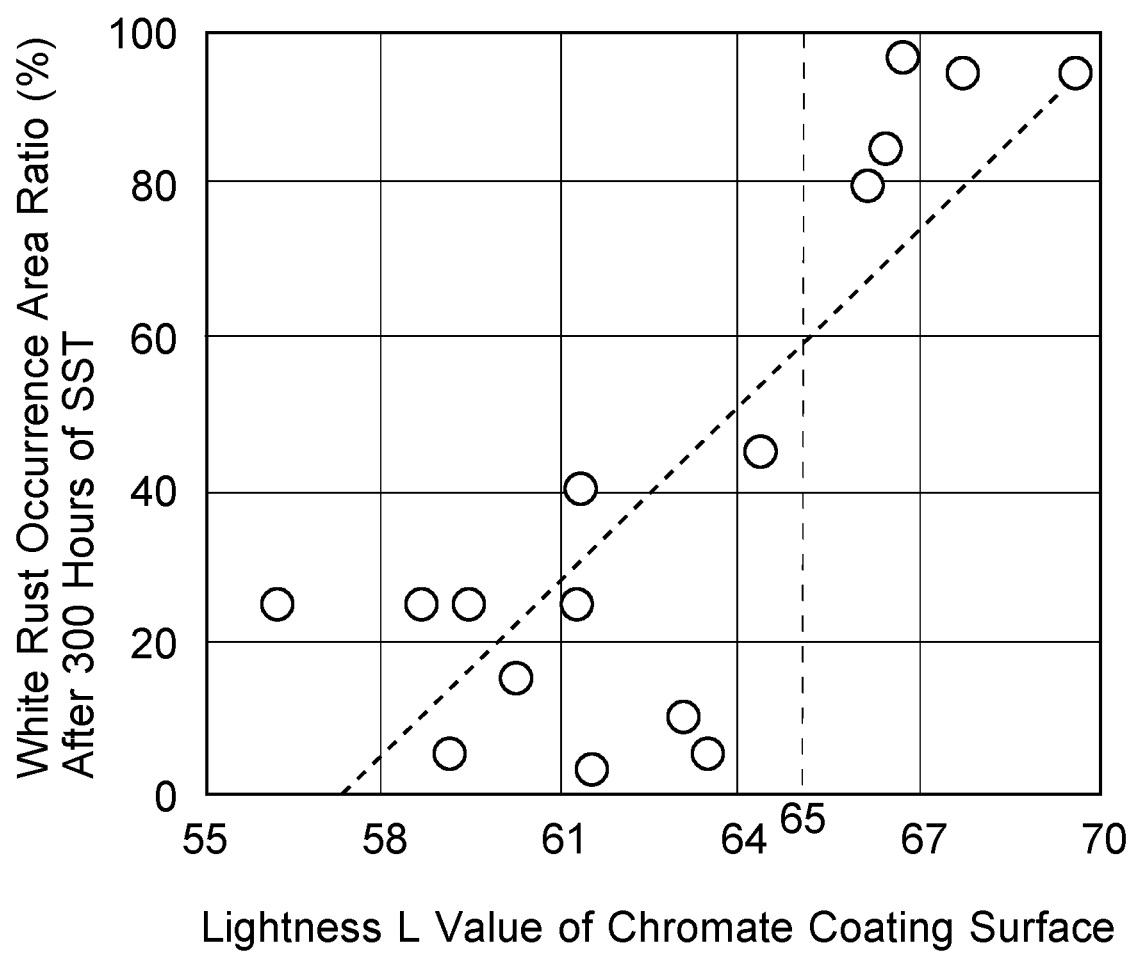
FIG. 1 is a view illustrating the relation between a lightness L value of a chromate coating surface, and a white rust occurrence area ratio (%) after 300 hours of a salt spray test (SST).

The present inventors discovered that a correlation exists between the white rust occurrence area ratio and a lightness L value of a chromate coating surface. FIG. 1 is a view illustrating the relation between the lightness L value of a chromate coating surface and the white rust occurrence area ratio (%) after 300 hours of a salt spray test (SST). FIG. 1 was obtained by means of an example that is described later.

The ordinate in FIG. 1 represents a white rust occurrence area ratio (%). The abscissa in FIG. 1 represents a lightness L value of a chromate coating surface. Referring to FIG. 1, there is an approximate correlation between the lightness L value of the chromate coating surface and the white rust occurrence area ratio, with the white rust occurrence area ratio tending to decrease as the lightness L value of the chromate coating surface becomes lower. When the lightness L value of the chromate coating surface is less than 65, the white rust occurrence area ratio is less than 50%.

That is, when the lightness L value of the chromate coating surface is less than 65, the threaded connection for oil country tubular goods exhibits excellent corrosion resistance. In addition, the corrosion resistance tends to increase as the lightness L value of the chromate coating surface becomes lower.

Next, the present inventors discovered the conditions of a chromate treatment for obtaining excellent corrosion resistance in a threaded connection for oil country tubular goods as described hereunder.

A chromate coating formation step that forms a chromate coating usually includes a chromate treatment step and a drying step. Conventionally, in a chromate treatment step, the material to be treated is immersed in a chromating solution. In the drying step, the material to be treated is dried after the chromate treatment step.

[Stirring Speed of Chromating Solution in Chromate Treatment Step]

A chromate treatment is generally performed by immersing the material to be treated in a treatment solution. The method that manufacturers of commercial products for trivalent chromate treatment recommend is also an immersion treatment.

On the other hand, the pin and the box of a threaded connection for oil country tubular goods have a complex shape in which a plurality of places of unevenness of several mm in height at which the thread ridge/root is formed continue at a pitch of several mm. In addition, the pin of a threaded connection for oil country tubular goods is positioned at the end of a pipe that is several meters or more in length. In an integral-type threaded connection for oil country tubular goods, the box is also similarly positioned at the end of a pipe. Consequently, in the case of a threaded connection for oil country tubular goods, a chromate treatment is performed by bringing only the area in the vicinity of the part to be treated into contact with the treatment solution. Furthermore, in the case of a threaded connection for oil country tubular goods, when performing a chromate treatment by a common immersion technique, there is a risk that reactant gas will stay at the surface of the material to be treated and chromate treatment unevenness will occur. The occurrence of chromate treatment unevenness can be suppressed by performing the chromate treatment while circulating the chromating solution. In this case, the occurrence of portions to which chromate is not attached or at which the chromate coating is thin can be suppressed. Therefore, the corrosion resistance of the threaded connection for oil country tubular goods will be high even after being stored for a long period.

Figure 2:
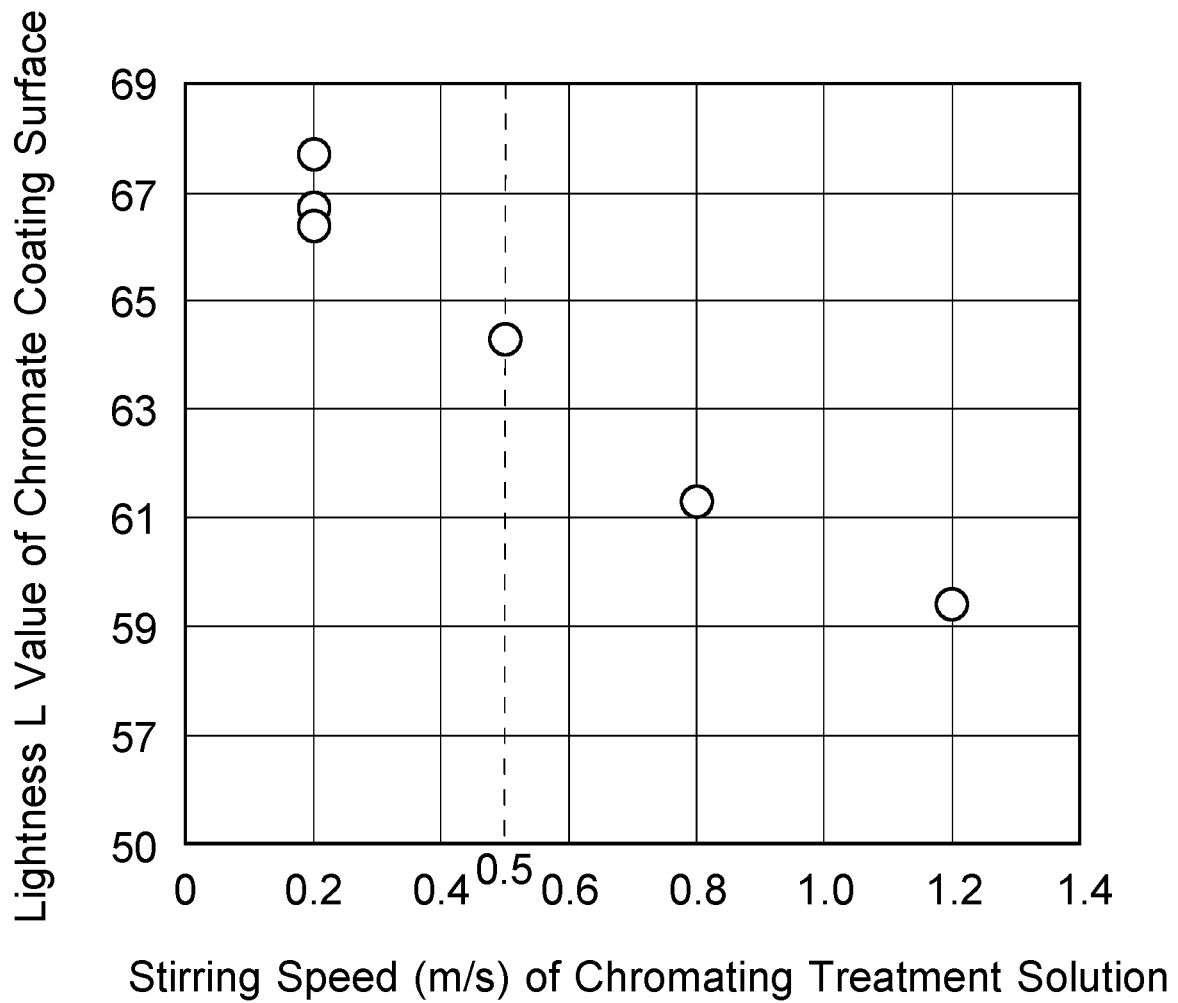
FIG. 2 is a view illustrating the relation between a stirring speed (m/s) of a chromating solution in a chromate treatment step, and a lightness L value of a chromate coating surface.

FIG. 2 is a view illustrating the relation between the stirring speed (m/s) of a chromating solution in the chromate treatment step and a lightness L value of a chromate coating surface. FIG. 2 is obtained by means of an example that is described later. For FIG. 2, test numbers for which conditions other than the stirring speed of the chromating solution were the same were compared. In FIG. 2, Test Nos. 4 to 6, 8 to 9 and 13 are shown.

Referring to FIG. 2, when the stirring speed of the chromating solution is equivalent to a linear speed of 0.5 m/s or more, the lightness L value of the chromate coating surface is less than 65. That is, the threaded connection for oil country tubular goods exhibits excellent corrosion resistance.

[Chromate Treatment Time in Chromate Treatment Step]

Conventionally, it has been thought that the greater the coating amount of a chromate coating is, the higher the corrosion resistance of the material that is treated will be. Therefore, the longer the chromate treatment time is, the higher the corrosion resistance of the threaded connection for oil country tubular goods is expected to be. However, with respect to the chromate treatment time, the present inventors found as the result of studies that shortening the chromate treatment time to a certain extent is effective for increasing the corrosion resistance of a threaded connection for oil country tubular goods.

Figure 3:
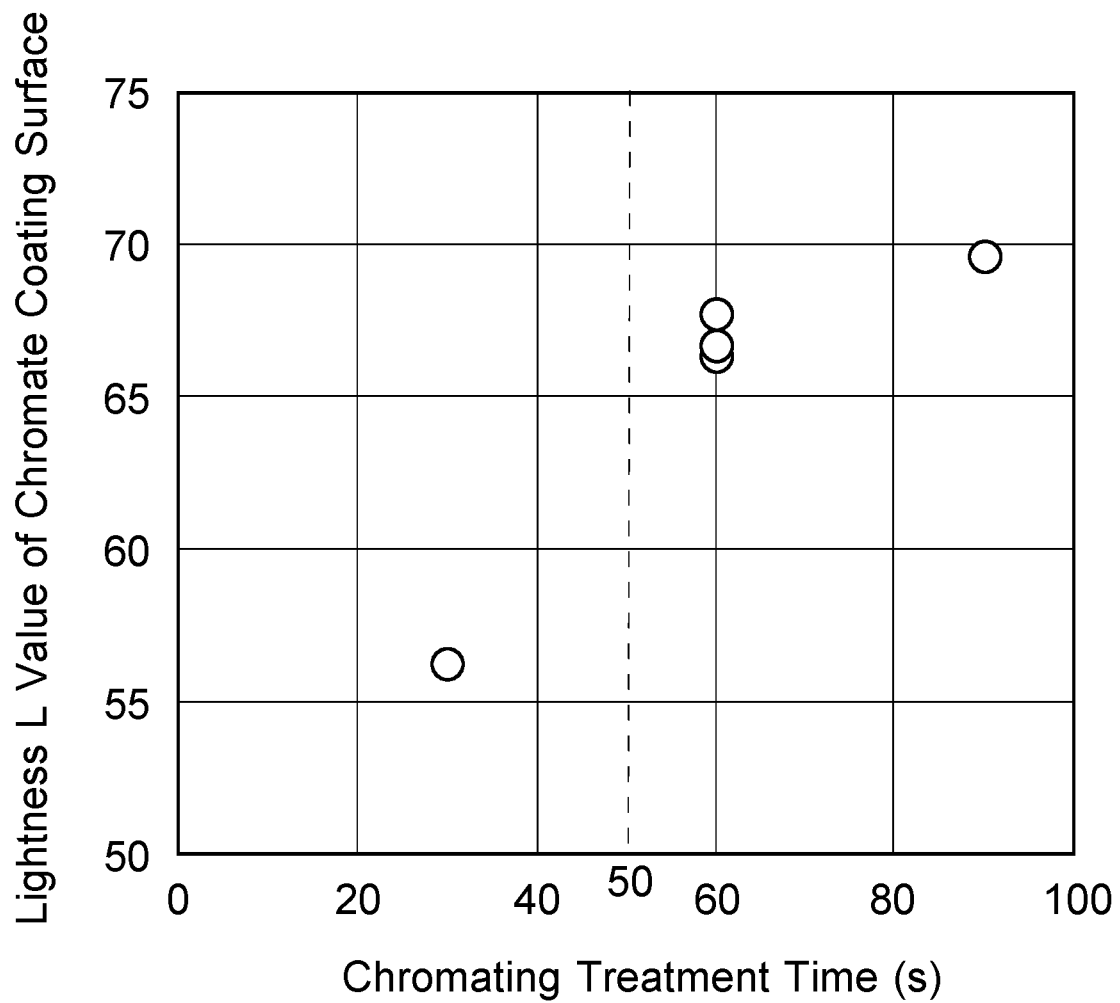
FIG. 3 is a view illustrating the relation between a chromate treatment time (s) in a chromate treatment step and a lightness L value of a chromate coating surface.

FIG. 3 is a view illustrating the relation between the chromate treatment time (s) in the chromate treatment step and the lightness L value of the chromate coating surface. FIG. 3 was obtained by means of an example that is described later. For FIG. 3, test numbers for which conditions other than the chromate treatment time were the same were compared. In FIG. 3, Test Nos. 1 and 4 to 7 are shown.

Referring to FIG. 3, when the chromate treatment time in the chromate treatment step is less than 50 seconds, the lightness L value of the chromate coating surface is less than 65. That is, the threaded connection for oil country tubular goods exhibits excellent corrosion resistance.

[Drying Temperature in Drying Step]

Conventionally, attempts have been made to raise the drying temperature in a drying step after chromate treatment to thereby increase the production efficiency. When the drying temperature is high, the time required until drying is completed is shortened, and the production efficiency increases. However, the present inventors found as the result of studies that setting the drying temperature in the drying step to a lower temperature to a certain extent is effective for increasing the corrosion resistance of a threaded connection for oil country tubular goods.

Figure 4:
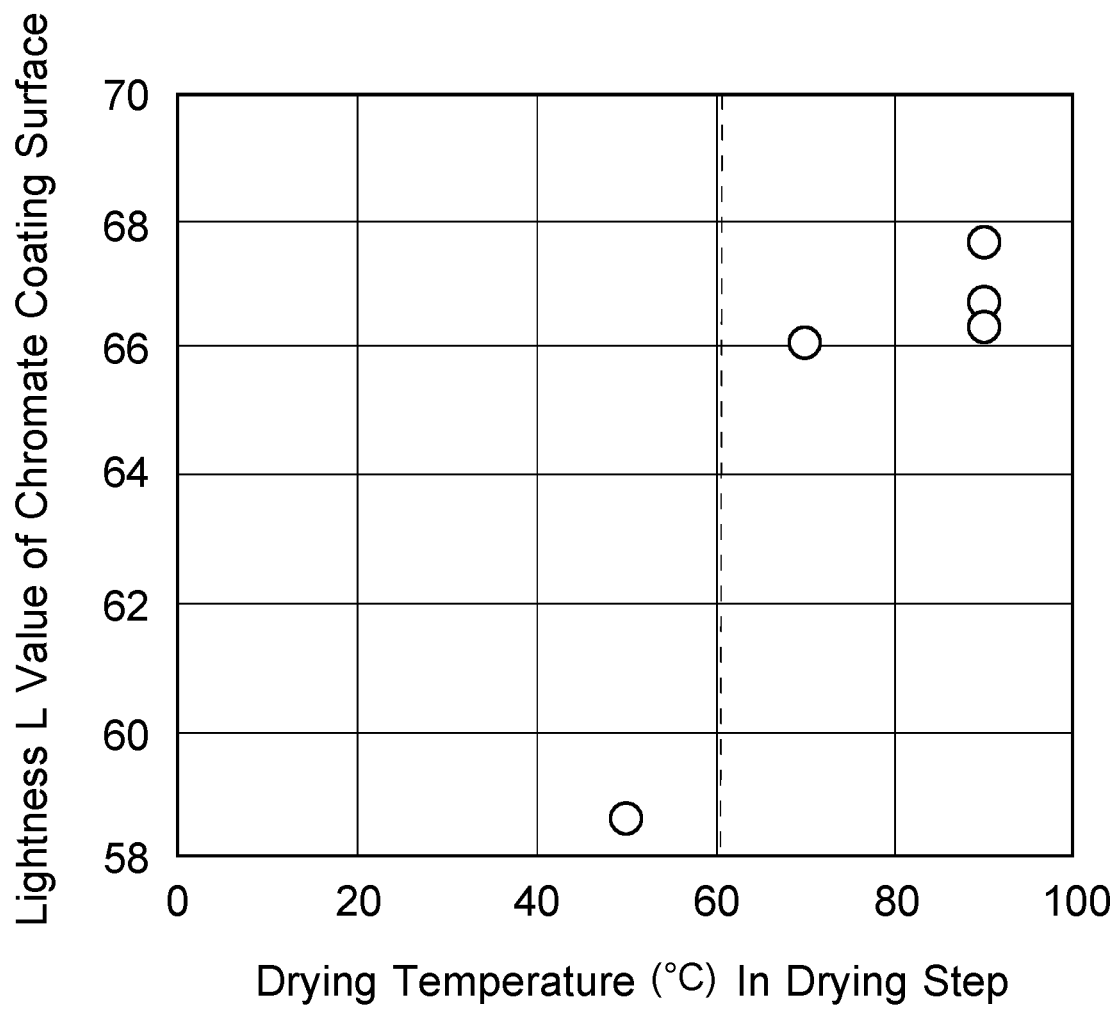
FIG. 4 is a view illustrating the relation between a drying temperature (° C.) in a drying step and a lightness L value of a chromate coating surface.

FIG. 4 is a view illustrating the relation between the drying temperature (° C.) in the drying step and the lightness L value of the chromate coating surface. FIG. 4 was obtained by means of an example that is described later. For FIG. 4, test numbers for which conditions other than the drying temperature were the same were compared. In FIG. 4, Test Nos. 2 to 6 are shown.

Referring to FIG. 4, when the drying temperature in the drying step is not more than 60° C., the lightness L value of the chromate coating surface is less than 65. That is, the threaded connection for oil country tubular goods exhibits excellent corrosion resistance.

As described above, in the chromate coating formation step of the present embodiment, if one or more conditions selected from the stirring speed of the chromating solution, the chromate treatment time, and the chromating solution drying temperature is satisfied, the threaded connection for oil country tubular goods exhibits excellent corrosion resistance.

The production method of the present embodiment that was completed based on the above findings is a method for producing a threaded connection for oil country tubular goods. The threaded connection for oil country tubular goods includes a pin and a box. The pin includes a pin-side contact surface that includes a pin-side threaded portion. The box includes a box-side contact surface that includes a box-side threaded portion. The method for producing the threaded connection for oil country tubular goods includes a Zn—Ni alloy plating layer formation step and a chromate coating formation step after the Zn—Ni alloy plating layer formation step. In the Zn—Ni alloy plating layer formation step, at least one of the pin-side contact surface and the box-side contact surface is immersed in a plating solution containing zinc ions and nickel ions, and a Zn—Ni alloy plating layer is formed on at least one of the pin-side contact surface and the box-side contact surface by electroplating. The Zn—Ni alloy plating layer is consisting of a Zn—Ni alloy and impurities. In the chromate coating formation step, a chromate coating is formed on the Zn—Ni alloy plating layer. The chromate coating formation step includes a chromate treatment step and a drying step after the chromate treatment step. In the chromate treatment step, the pin-side contact surface and/or the box-side contact surface having the Zn—Ni alloy plating layer formed thereon is immersed in a chromating solution containing chromium ions to perform a chromate treatment. In the drying step, a drying treatment is performed on the pin-side contact surface and/or the box-side contact surface after the chromate treatment step. In the chromate coating formation step, one or more conditions selected from condition 1 to condition 3 hereunder is satisfied:

Condition 1: Stirring speed of chromating solution in chromate treatment step: linear speed of 0.5 m/s or more;

Condition 2: Chromate treatment time in chromate treatment step: less than 50 seconds; and Condition 3: Drying temperature in drying step: 60° C. or less.

In the method for producing a threaded connection for oil country tubular goods of the present embodiment, the conditions in the chromate coating formation step are appropriately adjusted. Consequently, a threaded connection for oil country tubular goods including a chromate coating for which the lightness L value on the surface thereof is low can be produced. The threaded connection for oil country tubular goods exhibits excellent corrosion resistance.

In the aforementioned method for producing a threaded connection for oil country tubular goods, the chromate coating formation step may satisfy at least condition 1, and the chromate coating formation step may further include a non-stirring immersion step. The non-stirring immersion step is performed after the chromate treatment step and before the drying step. In the non-stirring immersion step, the pin-side contact surface and/or the box-side contact surface is immersed for a certain time period in the chromating solution while stirring of the chromating solution is stopped.

In the aforementioned method for producing a threaded connection for oil country tubular goods, the pin-side contact surface may further include a pin-side metal seal portion and a pin-side shoulder portion. The aforementioned box-side contact surface may further include a box-side metal seal portion and a box-side shoulder portion.

A threaded connection for oil country tubular goods of the present embodiment includes a pin, a box, a Zn—Ni alloy plating layer and a chromate coating. The pin includes a pin-side contact surface including a pin-side threaded portion. The box includes a box-side contact surface including a box-side threaded portion. The Zn—Ni alloy plating layer is formed on at least one of the pin-side contact surface and the box-side contact surface. The Zn—Ni alloy plating layer is consisting of a Zn—Ni alloy and impurities. A chromate coating is formed on the Zn—Ni alloy plating layer. A lightness L value of the chromate coating surface is less than 65.

In the threaded connection for oil country tubular goods of the present embodiment, the lightness L value of the chromate coating surface is less than 65. Therefore, the threaded connection for oil country tubular goods exhibits excellent corrosion resistance.

A coating amount of a chromate coating of the aforementioned threaded connection for oil country tubular goods may be 10 to 300 mg/m$^2$ expressed in terms of chromium.

When the coating amount of the chromate coating is within the aforementioned range, the threaded connection for oil country tubular goods exhibits consistently high corrosion resistance.

In the aforementioned threaded connection for oil country tubular goods, the pin-side contact surface may further include a pin-side metal seal portion and a pin-side shoulder portion. The aforementioned box-side contact surface may further include a box-side metal seal portion and a box-side shoulder portion.

Hereunder, the threaded connection for oil country tubular goods and the method for producing the threaded connection for oil country tubular goods according to the present embodiment are described in detail.

[Threaded Connection for Oil Country Tubular Goods]

Figure 5:
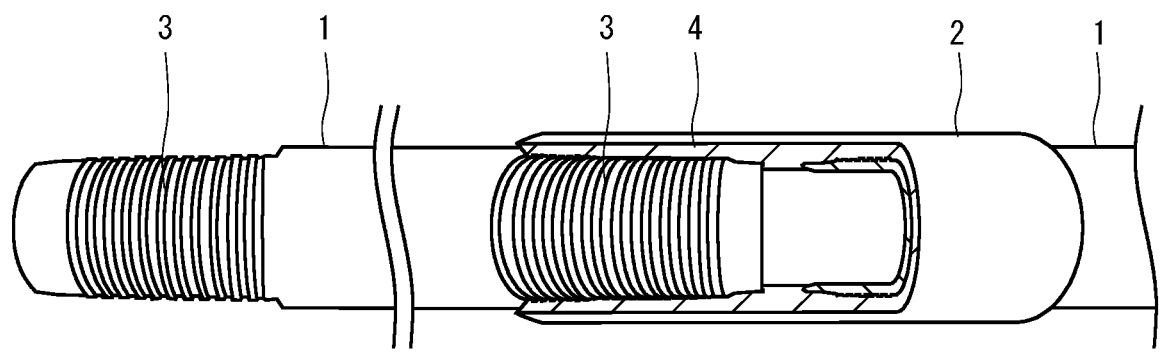
FIG. 5 is a view illustrating the configuration of a coupling-type threaded connection for oil country tubular goods according to the present embodiment.

The threaded connection for oil country tubular goods includes a pin and a box. FIG. 5 is a view illustrating a configuration of a coupling-type threaded connection for oil country tubular goods according to the present embodiment. Referring to FIG. 5, the threaded connection for oil country tubular goods includes a steel pipe 1 and a coupling 2. A pin 3 is formed at each end of the steel pipe 1, and the pin 3 includes a male threaded portion in its outer surface. A box 4 is formed at each end of the coupling 2, and the box 4 includes a female threaded portion in its inner surface. The coupling 2 is attached to the end of the steel pipe 1 by fastening the pin 3 and the box 4 together. Although not illustrated in the drawing, a pin 3 of the steel pipe 1 and a box 4 of the coupling 2 that are not coupled to a mating member may have a protector attached thereto for protecting their threaded portions.

Figure 6:
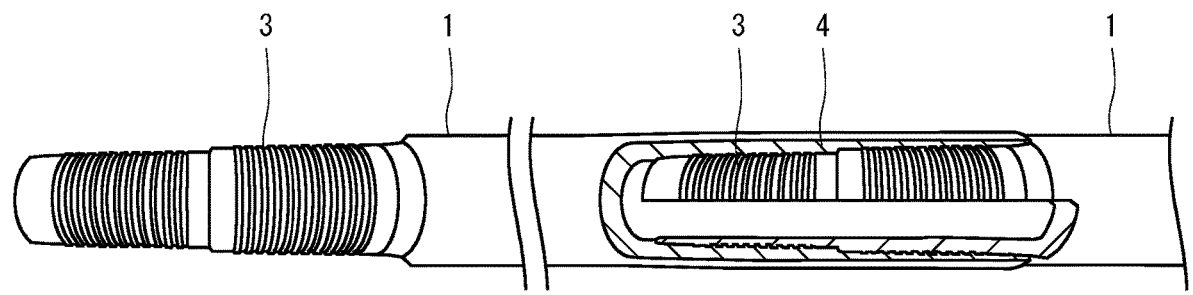
FIG. 6 is a view illustrating the configuration of an integral-type threaded connection for oil country tubular goods according to the present embodiment.

On the other hand, an integral-type threaded connection for oil country tubular goods may also be used, in which the coupling 2 is not used and, instead, one of the ends of the steel pipe 1 is used as the pin 3, and the other end of the steel pipe 1 is used as the box 4. FIG. 6 is a view illustrating a configuration of an integral-type threaded connection for oil country tubular goods according to the present embodiment. Referring to FIG. 6, the threaded connection for oil country tubular goods includes a steel pipe 1. A pin 3 is formed at one end of the steel pipe 1, and the pin 3 includes a male threaded portion in its outer surface. A box 4 is formed at the other end of the steel pipe 1, and the box 4 includes a female threaded portion in its inner surface. Two of the steel pipes 1 can be connected by fastening the pin 3 and the box 4 together. The threaded connection for oil country tubular goods of the present embodiment can be used for both of a coupling-type and an integral-type threaded connection for oil country tubular goods.

Figure 7:
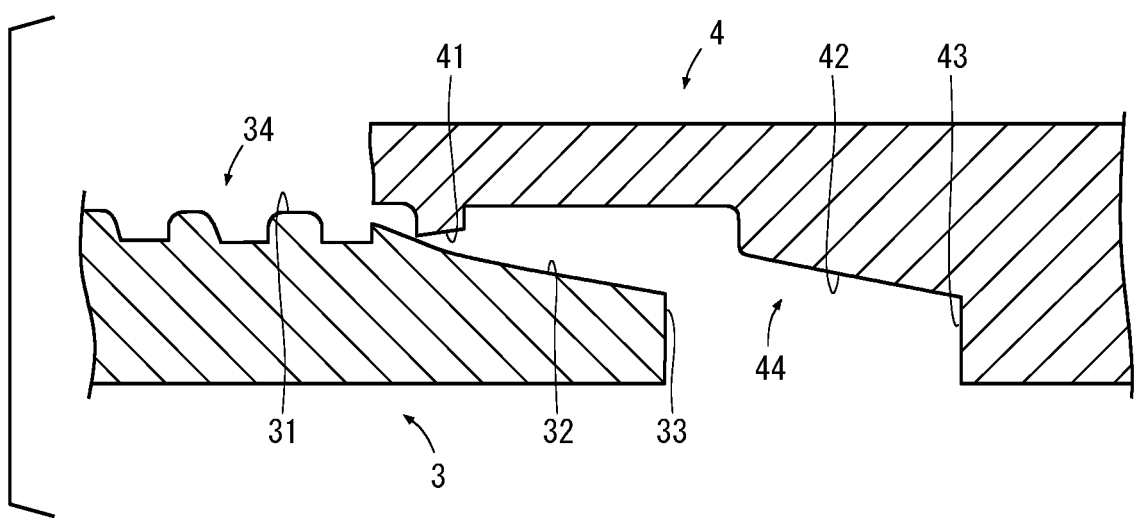
FIG. 7 is a cross-sectional view of a threaded connection for oil country tubular goods.

FIG. 7 is a cross-sectional view of a threaded connection for oil country tubular goods. In FIG. 7, a pin 3 includes a pin-side threaded portion 31, a pin-side metal seal portion 32 and a pin-side shoulder portion 33. In FIG. 7, a box 4 includes a box-side threaded portion 41, a box-side metal seal portion 42 and a box-side shoulder portion 43. The portions at which the pin 3 and the box 4 come into contact with each other when they are fastened together are referred to as "contact surfaces 34 and 44". Specifically, when the pin 3 and the box 4 have been fastened to each other, the two threaded portions (pin-side threaded portion 31 and box-side threaded portion 41) come into contact with each other, and so do the two metal seal portions (pin-side metal seal portion 32 and box-side metal seal portion 42) and the two shoulder portions (pin-side shoulder portion 33 and box-side shoulder portion 43). In FIG. 7, the pin-side contact surface 34 includes the pin-side threaded portion 31, the pin-side metal seal portion 32 and the pin-side shoulder portion 33. In FIG. 7, the box-side contact surface 44 includes the box-side threaded portion 41, the box-side metal seal portion 42 and the box-side shoulder portion 43.

In FIG. 7, in the pin 3, the pin-side shoulder portion 33, the pin-side metal seal portion 32 and the pin-side threaded portion 31 are arranged in that order from the end of the steel pipe 1. Further, in the box 4, the box-side threaded portion 41, the box-side metal seal portion 42 and the box-side shoulder portion 43 are arranged in that order from the end of the steel pipe 1 or the coupling 2. However, the arrangement of the pin-side threaded portion 31 and the box-side threaded portion 41, the pin-side metal seal portion 32 and the box-side metal seal portion 42, and the pin-side shoulder portion 33 and the box-side shoulder portion 43 is not limited to the arrangement illustrated in FIG. 7, and the arrangement can be changed as appropriate. For example, as illustrated in FIG. 6, in the pin 3, the aforementioned parts may be arranged from the end of the steel pipe 1 in the order of the pin-side metal seal portion 32, the pin-side threaded portion 31, the pin-side metal seal portion 32, the pin-side shoulder portion 33, the pin-side metal seal portion 32 and the pin-side threaded portion 31. In the box 4, the aforementioned parts may be arranged from the end of the steel pipe 1 or the coupling 2 in the order of the box-side metal seal portion 42, the box-side threaded portion 41, the box-side metal seal portion 42, the box-side shoulder portion 43, the box-side metal seal portion 42 and the box-side threaded portion 41.

Figure 8:
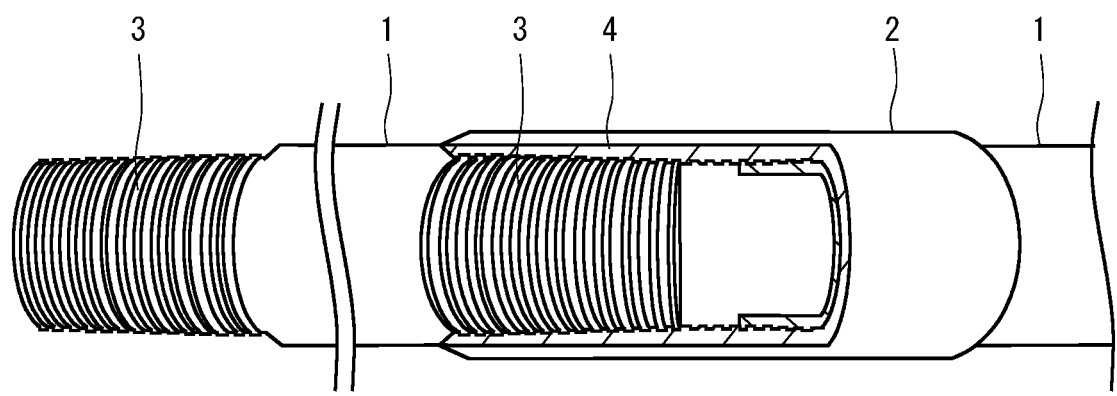
FIG. 8 is a view illustrating the configuration of a threaded connection for oil country tubular goods according to the present embodiment that does not have a metal seal portion and a shoulder portion.

In FIG. 5 to FIG. 7, so-called "premium joints" which include metal seal portions (pin-side metal seal portion 32 and box-side metal seal portion 42) and shoulder portions (pin-side shoulder portion 33 and box-side shoulder portion 43) are illustrated. However, the metal seal portions (pin-side metal seal portion 32 and box-side metal seal portion 42) and the shoulder portions (pin-side shoulder portion 33 and box-side shoulder portion 43) need not be included. An example of a threaded connection for oil country tubular goods that does not have the metal seal portions 32 and 42 and the shoulder portions 33 and 43 is illustrated in FIG. 8. The threaded connection for oil country tubular goods of the present embodiment is also favorably applicable as a threaded connection for oil country tubular goods which does not have the metal seal portions 32 and 42 and the shoulder portions 33 and 43. When the metal seal portions 32 and 42 and the shoulder portions 33 and 43 are not provided, the pin-side contact surface 34 includes the pin-side threaded portion 31. When the metal seal portions 32 and 42 and the shoulder portions 33 and 43 are not provided, the box-side contact surface 44 includes the box-side threaded portion 41.

Figure 9:
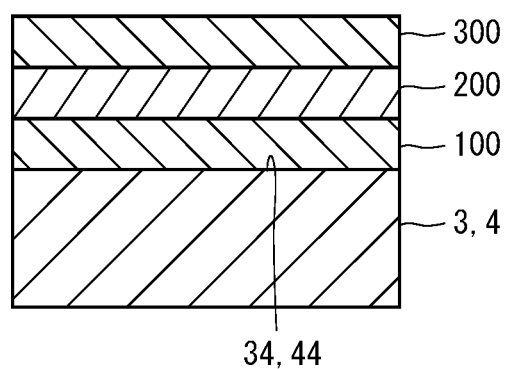
FIG. 9 is a cross-sectional view of one example of a contact surface of a threaded connection for oil country tubular goods according to the present embodiment.

FIG. 9 is a cross-sectional view of one example of the contact surfaces 34 and 44 of the threaded connection for oil country tubular goods according to the present embodiment. The threaded connection for oil country tubular goods includes a Zn—Ni alloy plating layer 100 on at least one of the pin-side contact surface 34 and the box-side contact surface 44. The threaded connection for oil country tubular goods further includes a chromate coating 200 on the Zn—Ni alloy plating layer 100. The threaded connection for oil country tubular goods may include the Zn—Ni alloy plating layer 100 and the chromate coating 200 on both of the pin-side contact surface 34 and the box-side contact surface 44.

The threaded connection for oil country tubular goods may include the Zn—Ni alloy plating layer 100 and the chromate coating 200 on the pin-side contact surface 34, and may include only the Zn—Ni alloy plating layer 100 on the box-side contact surface 44. The threaded connection for oil country tubular goods may include the Zn—Ni alloy plating layer 100 and the chromate coating 200 on the pin-side contact surface 34, and may include only the chromate coating 200 on the box-side contact surface 44.

The threaded connection for oil country tubular goods may include the Zn—Ni alloy plating layer 100 and the chromate coating 200 on the box-side contact surface 44, and may include only the Zn—Ni alloy plating layer 100 on the pin-side contact surface 34. The threaded connection for oil country tubular goods may include the Zn—Ni alloy plating layer 100 and the chromate coating 200 on the box-side contact surface 44, and may include only the chromate coating 200 on the pin-side contact surface 34.

[Zn—Ni Alloy Plating Layer]

The Zn—Ni alloy plating layer 100 is formed on at least one of the pin-side contact surface 34 and the box-side contact surface 44. The Zn—Ni alloy plating layer 100 may be formed directly on at least one of the pin-side contact surface 34 and the box-side contact surface 44. Another plating layer may be formed between the Zn—Ni alloy plating layer 100 and the pin-side contact surface 34. Another plating layer may be formed between the Zn—Ni alloy plating layer 100 and the box-side contact surface 44.

The Zn—Ni alloy plating layer 100 is consisting of a Zn—Ni alloy and impurities. The Zn—Ni alloy contains zinc (Zn) and nickel (Ni). The Zn—Ni alloy may sometimes contain impurities. In this case, the impurities of the Zn—Ni alloy plating layer 100 and the impurities of the Zn—Ni alloy are substances other than Zn and Ni, and include substances that become contained in the Zn—Ni alloy plating layer 100 during production or the like of the threaded connection for oil country tubular goods and the content of which is within a range that does not influence the effects of the present invention. The Zn—Ni alloy plating layer 100 has a composition in which, when the total of Zn and Ni is taken as 100 mass %, the proportion of Ni is in a range of 10 to 20 mass %. A lower limit of the Ni content of the Zn—Ni alloy plating layer 100 is preferably 11 mass %, and more preferably is 12 mass %. An upper limit of the Ni content of the Zn—Ni alloy plating layer 100 is preferably 18 mass %, and more preferably is 16 mass %.

[Method for Measuring Chemical Composition of Zn—Ni Alloy Plating Layer]

The chemical composition of the Zn—Ni alloy plating layer 100 is measured by the following method. A desktop fluorescent X-ray analyzer (FISCHERSCOPE X-RAY XDAL, manufactured by Fischer Instruments K. K.) is used for the measurement. A calibration curve is prepared using a commercially available standard plate of a Zn—Ni alloy plated steel plate. Measurements are made on the Ni content (mass %) at four locations on the surface (four locations at 0°, 90°, 180° and 270° in the pipe circumferential direction of the threaded connection for oil country tubular goods) of the Zn—Ni alloy plating layer 100, and the arithmetic mean of the measurement results for the four locations is taken as the Ni content (mass %) of the Zn—Ni alloy plating layer 100.

[Thickness of Zn—Ni Alloy Plating Layer]

The thickness of the Zn—Ni alloy plating layer 100 is not particularly limited. The thickness of the Zn—Ni alloy plating layer 100 is, for example, in a range of 1 to 20 µm. If the thickness of the Zn—Ni alloy plating layer 100 is 1 µm or more, adequate galling resistance can be obtained. Even if the thickness of the Zn—Ni alloy plating layer 100 is more than 20 µm, the aforementioned effect will be saturated. The lower limit of the thickness of the Zn—Ni alloy plating layer 100 is preferably 3 µm, and more preferably is 5 µm. The upper limit of the thickness of the Zn—Ni alloy plating layer 100 is preferably 18 µm, and more preferably is 15 µm.

The thickness of the Zn—Ni alloy plating layer 100 is measured by the following method. A probe of an eddy current phase-type film thickness measuring instrument conforming to ISO (International Organization for Standardization) 21968 (2005) is brought into contact with the Zn—Ni alloy plating layer 100. A phase difference between a high-frequency magnetic field on the input side of the probe and an eddy current on the Zn—Ni alloy plating layer 100 that was excited by the high-frequency magnetic field is measured. The phase difference is converted into a thickness of the Zn—Ni alloy plating layer 100.

The Zn—Ni alloy plating layer 100 may be formed on a part of the contact surface 34 and/or 44, or may be formed on the entire contact surface 34 and/or 44. The interfacial pressure at the metal seal portions 32 and 42 increases, in particular, in the final stage of fastening. Therefore, in a case where the Zn—Ni alloy plating layer 100 is partially formed on the contact surface 34 and/or 44, it is preferable that the Zn—Ni alloy plating layer 100 is formed on at least the metal seal portion 32 and/or 42. On the other hand, when the Zn—Ni alloy plating layer 100 is formed on the entire contact surface 34 and/or 44, the production efficiency of the threaded connection for oil country tubular goods increases.

With respect to the hardness and melting point of the Zn—Ni alloy plating layer 100, the hardness is higher than the hardness of a Cu plating layer that has conventionally been used as a plating layer of a threaded connection for oil country tubular goods, and the melting point is also equally high as the melting point of the Cu plating. Therefore, damage to the Zn—Ni alloy plating layer 100 is suppressed even when fastening and loosening are repeated. Consequently, the galling resistance is maintained even when fastening and loosening are repeated.

In addition, zinc (Zn) that is contained in the Zn—Ni alloy plating layer 100 is a base metal in comparison to iron (Fe) that is a principal component of a steel pipe. Therefore, there is a sacrificial protection effect, and hence the threaded connection for oil country tubular goods exhibits increased corrosion resistance.

[Chromate Coating]

The threaded connection for oil country tubular goods of the present embodiment includes the chromate coating 200 on the Zn—Ni alloy plating layer 100. As described above, the threaded connection for oil country tubular goods, in some cases, is stored outdoors for a long period of time before being actually used. In such a case, the chromate coating 200, if formed, increases the corrosion resistance of the pin 3 and the box 4.

The chromate coating 200 is a coating containing trivalent chromium chromate. The chromate coating 200 is formed by a chromate coating formation step that is described later.

[L Value of Chromate Coating]

The lightness L value of the surface of the chromate coating 200 is less than 65. When the lightness L value of the surface of the chromate coating 200 is 65 or more, the white rust occurrence area ratio (%) is more than 50%. In such a case, the corrosion resistance of the threaded connection for oil country tubular goods decreases. From an aesthetic point of view with respect to the external appearance, the lightness L value of the surface of the chromate coating 200 is preferably 45 or more. The upper limit of the lightness L value of the surface of the chromate coating 200 is preferably 63, and more preferably is 60. The lower limit of the lightness L value of the surface of the chromate coating 200 is preferably 48, and more preferably is 50.

The lightness L value of the surface of the chromate coating 200 is measured as follows. Color difference measurement is performed in accordance with JIS Z 8730 (2009). Specifically, the mean value of two measurements is calculated using CR-300 manufactured by Konica Minolta Inc. The measurement locations are preferably the metal seal portions 32 and 42, or the shoulder portions 33 and 43. The measuring area is set to φ10 mm. The L*a*b* color system is used for the numerical values, and the L value that represents the lightness (lightness L value) is used as an index.

[Coating Amount of Chromate Coating]

The thickness, that is, the coating amount, of the chromate coating 200 is not particularly limited. The coating amount of the chromate coating 200 may be 10 to 300 mg/m$^2$ expressed in terms of chromium. When the coating amount of the chromate coating 200 is 10 mg/m$^2$ or more expressed in terms of chromium, the threaded connection for oil country tubular goods exhibits consistently high corrosion resistance. When the coating amount of the chromate coating 200 is 300 mg/m$^2$ or less expressed in terms of chromium, the occurrence of defects such as air gaps in the structure of the chromate coating 200 can be suppressed. Thus, the threaded connection for oil country tubular goods exhibits consistently high corrosion resistance. The lower limit (expressed in terms of chromium) of the coating amount of the chromate coating 200 is more preferably 20 mg/m$^2$, and further preferably is 50 mg/m$^2$. The upper limit (expressed in terms of chromium) of the coating amount of the chromate coating 200 is more preferably 250 mg/m$^2$, and further preferably is 200 mg/m$^2$.

The coating amount of the chromate coating 200 is measured by the following method. A test specimen having a size of 5 mm×20 mm is cut out from the pin 3 or box 4 that includes the chromate coating 200. The test specimen is immersed in an aqueous solution obtained by dissolving 50 g of sodium cyanide and 5 g of sodium hydroxide in 1 L of purified water. The chromate coating 200 of the test specimen is dissolved by passing a current therethrough for one minute at 15 A/dm$^2$ to perform cathode electrolysis. The solution of the chromate coating 200 is analyzed using an inductive coupling plasma mass spectrometer (ICPMS-2030) manufactured by Shimadzu Corporation.

[Lubricant Coating]

Referring to FIG. 9, the threaded connection for oil country tubular goods may further include a lubricant coating 300 on the chromate coating 200. When the threaded connection for oil country tubular goods includes the lubricant coating 300, the lubricity of the threaded connection for oil country tubular goods increases.

The lubricant coating 300 may be solid, or may be in a semi-solid state or a liquid state. A commercially available lubricant can be used as the lubricant coating 300. The lubricant coating 300 contains, for example, lubricating particles and a binder. As necessary, the lubricant coating 300 may contain a solvent and other components.

There is not particular limitation with respect to the lubricating particles as long they are particles having lubricity. The lubricating particles are, for example, one or more types selected from the group consisting of particles of graphite, $MoS_2$ (molybdenum disulfide), $WS_2$ (tungsten disulfide), BN (boron nitride), PTFE (polytetrafluoroethylene), CFx (graphite fluoride), and $CaCO_3$ (calcium carbonate).

The binder, for example, is one type or two types selected from the group consisting of an organic binder and an inorganic binder. The organic binder is, for example, one type or two types selected from the group consisting of a thermosetting resin and a thermoplastic resin. The thermosetting resin, for example, is one or more types selected from the group consisting of polyethylene resin, polyimide resin and polyamide-imide resin. The inorganic binder is, for example, one type or two types selected from the group consisting of compounds containing alkoxysilane and siloxane bonds.

An example of a commercially available lubricant is Seal-Guard ECF (trade name) manufactured by Jet-Lube LLC. Other examples of the lubricant coating 300 include a lubricant coating 300 containing rosin, metallic soap, wax and lubricant powder. The chemical composition of the lubricant coating 300 that is formed on the pin 3 side and the chemical composition of the lubricant coating 300 that is formed on the box 4 side may be the same or may be different.

The thickness of the lubricant coating 300 is not particularly limited. The thickness of the lubricant coating 300 is, for example, in a range of 10 to 100 μm. When the thickness of the lubricant coating 300 is 10 μm or more, the threaded connection for oil country tubular goods exhibits consistently high lubricity. Even if the thickness of the lubricant coating 300 is more than 100 μm, because the surplus amount of the lubricant coating 300 will be removed during fastening, the aforementioned effect will be saturated.

The thickness of the lubricant coating 300 is measured by the following method. The pin 3 or the box 4 that includes the lubricant coating 300 is prepared. The pin 3 or the box 4 is cut perpendicularly to the axial direction of the pipe. A cross-section including the lubricant coating 300 is observed by microscope. The magnification when observing the cross-section by microscope is ×500. By this means, the thickness of the lubricant coating 300 is determined.

[Base Material of Threaded Connection for Oil Country Tubular Goods]

The composition of the base material of the threaded connection for oil country tubular goods is not particularly limited. Examples of the base material include carbon steels, stainless steels and alloy steels. Among alloy steels, high alloy steels such as duplex stainless steels that contain alloying elements such as Cr, Ni and Mo and a Ni-alloy steel have high corrosion resistance. Therefore by using these high alloy steels as a base material, the threaded connection for oil country tubular goods exhibits increased corrosion resistance.

[Production Method]

The method for producing the threaded connection for oil country tubular goods of the present embodiment includes a Zn—Ni alloy plating layer formation step and a chromate coating formation step. The chromate coating formation step is performed after the Zn—Ni alloy plating layer formation step.

As described above, the threaded connection for oil country tubular goods includes the pin 3 and the box 4. The pin 3 has the pin-side contact surface 34 that includes the pin-side threaded portion 31. The box 4 has the box-side contact surface 44 that includes the box-side threaded portion 41. The pin-side contact surface 34 may further include the pin-side metal seal portion 32 and the pin-side shoulder portion 33. The box-side contact surface 44 may further include the box-side metal seal portion 42 and the box-side shoulder portion 43.

[Zn—Ni Alloy Plating Layer Formation Step]

In the Zn—Ni alloy plating layer formation step, the Zn—Ni alloy plating layer 100 consisting of a Zn—Ni alloy and impurities is formed on at least one of the pin-side contact surface 34 and the box-side contact surface 44. The Zn—Ni alloy plating layer 100 is formed by electroplating. The electroplating is performed by immersing at least one of the pin-side contact surface 34 and the box-side contact surface 44 in a plating solution containing zinc ions and nickel ions, and conducting a current through the relevant contact surface. The plating solution preferably contains zinc ions in an amount of 1 to 100 g/L and nickel ions in an amount of 1 to 50 g/L. The electroplating conditions can be set appropriately. The electroplating conditions are, for example, a plating solution pH of 1 to 10, a plating solution temperature of 10 to 60° C., a current density of 1 to 100 A/dm$^2$ and a treatment time of 0.1 to 30 minutes.

[Chromate Coating Formation Step]

In the chromate coating formation step, the chromate coating 200 is formed on the Zn—Ni alloy plating layer 100. In the present embodiment the term "chromate treatment" refers to a treatment that forms a coating containing trivalent chromium chromate (a chromate coating 200). The chromate coating 200 formed by the chromate treatment suppresses the occurrence of white rust on the surface of the Zn—Ni alloy plating layer 100. By this means, the threaded connection for oil country tubular goods exhibits increased corrosion resistance.

The chromate coating formation step includes a chromate treatment step and a drying step. The drying step is performed after the chromate treatment step.

[Chromate Treatment Step]

In the chromate treatment step, a chromate treatment is performed. In the chromate treatment, the pin-side contact surface 34 and/or the box-side contact surface 44 on which the Zn—Ni alloy plating layer 100 has been formed is immersed in a chromating solution. The chromating solution contains trivalent chromium ions. The chromating solution can be made to contain trivalent chromium ions by, for example, dissolving chromium chloride (III) and chromium sulfate (III). A commercially available chromating solution may be used for the chromating solution. The commercially available chromating solution is, for example, DAIN Chromate TR-02 (trade name) manufactured by Daiwa Fine Chemicals Co., Ltd. The temperature of the chromating solution is for example a room temperature.

[Drying Step]

In the drying step, the pin-side contact surface 34 and/or the box-side contact surface 44 is subjected to a drying treatment. In the drying treatment, the pin-side contact surface 34 and/or box-side contact surface 44 that has undergone the chromate treatment is immediately thereafter washed with water and then dried. The drying can be performed by means of a hot-blast stove or the like. The drying time is, for example, in a range of 1 to 100 minutes.

The treatment conditions in the chromate coating formation step satisfy one or more conditions selected from the following condition 1 to condition 3. In the present embodiment, if any one of these conditions is satisfied, the threaded connection for oil country tubular goods exhibits excellent corrosion resistance. The chromate coating formation step may satisfy two conditions of the following conditions, or may satisfy all of the following conditions.

Condition 1: Stirring speed of chromating solution in chromate treatment step: linear speed of 0.5 m/s or more;

Condition 2: Chromate treatment time in chromate treatment step: less than 50 seconds; and Condition 3: Drying temperature in drying step: 60° C. or less.

[Condition 1: Stirring Speed of Chromating Solution in Chromate Treatment Step: Linear Speed of 0.5 m/s or More]

Referring to FIG. 2, when the stirring speed of the chromating solution in the chromate treatment step is linear speed of 0.5 m/s or more, the threaded connection for oil country tubular goods exhibits excellent corrosion resistance. Preferably, stirring of the chromating solution is performed such that, as much as possible, a liquid current arises in the cutting direction of the thread of the threaded connection for oil country tubular goods. The term "cutting direction of the thread" refers to the circumferential direction of the steel pipe. In this case, it is possible to further suppress the retention of reactant gas during the chromate treatment.

The lower limit of the stirring speed is preferably 0.6 m/s, more preferably is 0.7 m/s, and further preferably is 0.8 m/s. Although the upper limit of the stirring speed is not particularly limited, the upper limit is preferably 2.0 m/s, more preferably is 1.5 m/s, and further preferably is 1.2 m/s.

[Condition 2: Chromate Treatment Time in Chromate Treatment Step: Less Than 50 Seconds]

Referring to FIG. 3, when the chromate treatment time in the chromate treatment step is less than 50 seconds, the threaded connection for oil country tubular goods exhibits excellent corrosion resistance. Conventionally, it has been considered that the greater the coating amount of the chromate coating is, the higher the corrosion resistance of the material that is treated will be. Therefore, it may be expected that the longer the chromate treatment time is, the higher the corrosion resistance of the threaded connection for oil country tubular goods will be. However, making the chromate treatment time a short time that is less than 50 seconds is effective for increasing the corrosion resistance of the threaded connection for oil country tubular goods.

The upper limit of the chromate treatment time is preferably 48 seconds, more preferably is 45 seconds, and further preferably is 40 seconds. Although the lower limit of chromate treatment time is not particularly limited, the lower limit is preferably 5 seconds, more preferably is 8 seconds, and further preferably is 10 seconds.

[Condition 3: Drying Temperature in Drying Step: 60° C. or Less]

Referring to FIG. 4, in the drying step, when the drying temperature is 60° C. or less, the threaded connection for oil country tubular goods exhibits excellent corrosion resistance. Accordingly, the drying temperature in the drying step is 60° C. or less. Conventionally, attempts have been made to raise the drying temperature in a drying step after a chromate treatment step in order to increase the production efficiency. If the drying temperature is high, the time required until completion of drying is shortened and the production efficiency is thereby increased. However, making the drying temperature in the drying step a low temperature of 60° C. or less is effective for increasing the corrosion resistance of the threaded connection for oil country tubular goods.

The upper limit of the drying temperature is preferably 58° C., more preferably is 55° C., and further preferably is 50° C. Although the lower limit of the drying temperature is not particularly limited, the lower limit is preferably 20° C., more preferably is 25° C., and further preferably is 30° C.

The threaded connection for oil country tubular goods of the present embodiment can be produced by performing the above steps.

[Non-Stirring Immersion Step]

In the aforementioned production method, the chromate coating formation step may satisfy at least the aforementioned condition 1, and the production method may further include a non-stirring immersion step. The non-stirring immersion step is performed after the chromate treatment step and before the drying step.

Conventionally, formation of a chromate coating 200 has been performed by immersing the material to be treated in a chromating solution. However, a step in which the chromating solution is stirred and, furthermore, the material to be treated is immersed while the stirring is stopped may be provided. By this means, at the initial stage in which the chromating solution is being stirred, a chromate coating 200 with fine grains is formed and the coverage ratio of the chromate coating 200 increases. Subsequently, by immersing the material to be treated without performing stirring, a chromate coating 200 with a sufficient coating amount is efficiently obtained while maintaining a high coverage ratio.

Because the chromate coating formation step satisfies the aforementioned condition 1, the stirring speed of the chromating solution in the chromate treatment step is 0.5 m/s or more. The non-stirring immersion step is performed after the chromate treatment step. In the non-stirring immersion step, the pin-side contact surface 34 and/or the box-side contact surface 44 is immersed in the chromating solution for a certain time period while stirring of the chromating solution is stopped. In the non-stirring immersion step, it suffices to immerse the pin-side contact surface 34 and/or the box-side contact surface 44 in the same chromating solution as was used in the chromate treatment step in a continuous manner following the chromate treatment step. The non-stirring immersion step can be performed by stopping stirring after the chromate treatment step.

In the non-stirring immersion step, the pin-side contact surface 34 and/or the box-side contact surface 44 are immersed for a certain time period. Here, the certain time period means an arbitrary time period. The immersion time in the non-stirring immersion step is, for example, in a range of 10 to 100 seconds. The lower limit of the immersion time in the non-stirring immersion step is preferably 15 seconds, more preferably is 20 seconds, and further preferably is 30 seconds. The upper limit of the immersion time in the non-stirring immersion step is preferably 80 seconds, more preferably is 70 seconds, and further preferably is 60 seconds.

[Surface Preparation Treatment Step]

As necessary, the production method of the present embodiment may include a surface preparation treatment step before the Zn—Ni alloy plating layer 100 formation step. The surface preparation treatment step includes, for example, pickling and alkali degreasing. In the surface preparation treatment step, oil or the like adhering to the contact surface is cleaned off. The surface preparation treatment step may further include a grinding process such as sandblasting and finish machine grinding. Only one kind of these surface preparation treatments may be performed, or a plurality of the surface preparation treatments may be performed in combination.

[Coating Formation Step]

A coating formation step may be performed after forming the aforementioned chromate coating 200. In the coating formation step, the lubricant coating 300 is formed on the chromate coating 200.

The lubricant coating 300 can be formed by applying a composition or lubricant containing the components of the aforementioned lubricant coating 300 onto the aforementioned chromate coating 200. The application method is not particularly limited. Examples of the application method include spray coating, brushing, and dipping. When adopting spray coating as the application method, the composition or lubricant may be heated and then sprayed in a state in which the flowability has been increased. Although the lubricant coating 300 may be formed on one part of the contact surface 34 and/or 44, it is preferable to uniformly form the lubricant coating 300 on the entire contact surface 34 and/or 44. The coating formation step may be performed on both of the pin 3 and the box 4, or may be performed on only one of the pin 3 and the box 4.

EXAMPLE

An example will be described below. The symbol "%" in the example means mass percent.

In the present example, commercially available cold-rolled steel plates were used based on the assumption of use as a base material for a threaded connection. Each cold-rolled steel plate had dimensions of 150 mm in length×100 mm in width (plated surface: 100 mm in length×100 mm in width). The steel type was ultra-low carbon steel. The chemical composition of the steel plate was C: 0.19%, Si: 0.25%, Mn: 0.8%, P: 0.02%, S: 0.01%, Cu: 0.04%, Ni: 0.1%, Cr: 13%, and Mo: 0.04%, with the balance being Fe and impurities.

[Zn—Ni Alloy Plating Layer Formation Step]

A plating layer was formed on cold-rolled steel plate of each test number. Formation of a Zn—Ni alloy plating layer was conducted by electroplating. The plating solution used was DAIN Zinalloy N-PL (trade name) manufactured by Daiwa Fine Chemicals Co., Ltd. The plating solution was stirred by circulating the plating solution using a pump. The stirring speed of the plating solution was set to a linear speed of the plating solution of 0.5 m/s. The plating current density was set to 6 A/dm$^2$. The plating time was set to 345 seconds. The thickness of the obtained Zn—Ni alloy plating layer was approximately 8 μm. The percentage content of Ni in the obtained Zn—Ni alloy plating layer was approximately 13%.

[Chromate Coating Formation Step]

[Chromate Treatment Step]

The chromate coating was formed on the Zn—Ni alloy plating layer. Formation of the chromate coating was performed by a chromate treatment. The chromating solution used was DAIN Chromate TR-02 (trade name) manufactured by Daiwa Fine Chemicals Co., Ltd. In cases where the chromating solution was stirred, the chromating solution was stirred by being circulated using a pump. The stirring speeds of the chromating solution and the chromate treatment time were as shown in Table 1. In Table 1, the value for "Stirring Speed of Chromate treatment Solution (m/s)" is the stirring speed of the chromating solution, and represents the circulating quantity in a case where the chromating solution is circulated by a pump as expressed in terms of the linear speed of the chromating solution.

[Drying Step]

After undergoing the chromate treatment, the material being treated was immediately washed with purified water, and then dried by means of a hot-blast stove. In the drying step, the set temperature of the hot-blast stove was in a range of 50 to 90° C., and the drying time was set in a range of 5 to 15 minutes. The conditions for drying step of each test number are shown in Table 1.

[Non-Stirring Immersion Step]

In Test No. 15 and Test No. 16, a non-stirring immersion step was performed as described above. The respective immersion times in the non-stirring immersion step are shown in Table 1.

TABLE 1

| | Chromate treatment Step | | Non-Stirring Immersion Step | | Drying Step | | Chromate Coating | White Rust Occurrence Area ratio (%) After Salt Spray Test | | |
|---|---|---|---|---|---|---|---|---|---|---|
| Test No. | Stirring Speed of Chromate treatment Solution (m/s) | Chromate treatment Time (s) | Stirring Speed of Chromate treatment Solution (m/s) | Immersion Time (s) | Temperature (° C.) | Time (minutes) | Lightness L Value | Cr Coating amount (mg/m$^2$) | After 300 Hours | After 528 Hours | After 1008 Hours |
| 1 | 0.2 | 30 | — | — | 90 | 15 | 56.2 | — | 25 | — | — |
| 2 | 0.2 | 60 | — | — | 50 | 15 | 58.6 | — | 25 | — | — |
| 3 | 0.2 | 60 | — | — | 70 | 15 | 66.1 | — | 80 | — | — |
| 4 | 0.2 | 60 | — | — | 90 | 5 | 66.4 | — | 85 | — | — |
| 5 | 0.2 | 60 | — | — | 90 | 10 | 66.7 | — | 97 | — | — |
| 6 | 0.2 | 60 | — | — | 90 | 15 | 67.7 | — | 95 | — | — |
| 7 | 0.2 | 90 | — | — | 90 | 15 | 69.6 | — | 95 | — | — |

TABLE 1-continued

| | Chromate treatment Step | | Non-Stirring Immersion Step | | | | Chromate Coating | | White Rust Occurrence Area ratio (%) After Salt Spray Test | | |
|---|---|---|---|---|---|---|---|---|---|---|---|
| | Stirring Speed | | Stirring Speed | | | | | Cr | | | |
| | of Chromate | Chromate | of Chromate | | Drying Step | | | Coating | After | After | After |
| Test No. | treatment Solution (m/s) | treatment Time (s) | treatment Solution (m/s) | Immersion Time (s) | Temperature (° C.) | Time (minutes) | Lightness L Value | amount (mg/m$^2$) | 300 Hours | 528 Hours | 1008 Hours |
| 8  | 0.5 | 60  | —  | —  | 90 | 15 | 64.3 | —    | 45 | —  | —  |
| 9  | 0.8 | 60  | —  | —  | 90 | 15 | 61.3 | —    | 40 | —  | —  |
| 10 | 0   | 30  | —  | —  | 90 | 15 | 63.0 | 36.7 | 10 | 25 | 45 |
| 11 | 0.6 | 30  | —  | —  | 90 | 15 | 63.4 | 69.3 | 5  | 20 | 70 |
| 12 | 1.2 | 30  | —  | —  | 90 | 15 | 59.1 | 67.2 | 5  | 15 | 55 |
| 13 | 1.2 | 60  | —  | —  | 90 | 15 | 59.4 | 61.1 | 25 | 50 | 75 |
| 14 | 1.2 | 120 | —  | —  | 90 | 15 | 61.5 | 77.4 | 3  | 15 | 45 |
| 15 | 0.6 | 15  | 0  | 30 | 90 | 15 | 60.2 | 53.0 | 15 | 30 | 50 |
| 16 | 0.6 | 15  | 0  | 60 | 90 | 15 | 61.2 | 59.1 | 25 | 40 | 95 |

[Lightness L Value Measurement Test]

The lightness L value of each chromate coating surface was measured by the method described above. The results are shown in Table 1.

[Test for Measuring Coating Amount of Chromate Coating]

For Test No. 10 to Test No. 16, the coating amount (expressed in terms of chromium) of the chromate coating was measured by the method described above. The results are shown in the "Cr Coating amount" column in Table 1. Note that, in Table 1, "-" for Test No. 1 to Test No. 9 indicates that Cr coating amount was not measured and does not indicate that Cr was not detected.

[Corrosion Resistance Test]

The corrosion resistance was evaluated by means of the white rust occurrence area ratio (%) after 300 hours of a salt spray test (SST). A salt spray test was performed with respect to Test No. 1 to Test No. 16. The size of the test specimen was 70 mm×150 mm, and the thickness was 1 mm. The salt spray test was conducted based on a method described in JIS Z 2371 (2015). The test was conducted using a 5% saline solution under an atmosphere of 35° C. The salt spraying time period was 300 hours. Portions at which white rust occurred on the test specimen surface of each Test No. were identified by visual inspection, and the areas thereof were measured. The area of portions at which white rust occurred relative to the entire test specimen surface was taken as a white rust occurrence area ratio (%). The results are shown in Table 1. In Test No. 10 to Test No. 16, salt spray tests were additionally conducted up to 528 hours and 1008 hours. The results are shown in Table 1. Note that, in Test No. 1 to Test No. 9, the salt spray test was completed in 300 hours. Therefore, in Table 1, "-" for Test No. 1 to Test No. 9 means that the white rust occurrence area ratio (%) was not measured.

[Evaluation Results]

Referring to Table 1, in Test No. 1, Test No. 2, and Test No. 8 to Test No. 16, in the chromate treatment step, one or more conditions selected from condition 1 to condition 3 was satisfied. Therefore, the L value was less than 65. As a result, the test specimens had excellent corrosion resistances with the white rust occurrence area ratio was less than 50%.

In contrast, in Test No. 3 to Test No. 7, no condition among condition 1 to condition 3 was satisfied. Therefore, the L value was not less than 65. As a result, the corrosion resistance was poor with the white rust occurrence area ratio was 50% or more.

An embodiment of the present invention has been described above. However, the foregoing embodiment is merely an example for implementing the present invention. Accordingly, the present invention is not limited to the above embodiment, and the above embodiment can be appropriately modified within a range which does not deviate from the gist of the present invention.

REFERENCE SIGNS LIST

1: Steel pipe
2: Coupling
3: Pin
31: Pin-side threaded portion
32: Pin-side metal seal portion
33: Pin-side shoulder portion
34: Pin-side contact surface
4: Box
41: Box-side threaded portion
42: Box-side metal seal portion
43: Box-side shoulder portion
44: Box-side contact surface
100: Zn—Ni alloy plating layer
200: Chromate coating
300: Lubricant coating

The invention claimed is:

1. A threaded connection for oil country tubular goods, the threaded connection comprising:
   a pin having a pin-side contact surface including a pin-side threaded portion;
   a box having a box-side contact surface including a box-side threaded portion;
   a Zn—Ni alloy plating layer consisting of a Zn—Ni alloy and impurities on at least one of the pin-side contact surface and the box-side contact surface; and
   a chromate coating on the Zn—Ni alloy plating layer,
   wherein a lightness L value of the chromate coating surface is 45 or more and less than 65.

2. The threaded connection for oil country tubular goods according to claim 1, wherein:
   a coating amount of the chromate coating is 10 to 300 mg/m$^2$ expressed in terms of chromium.

3. The threaded connection for oil country tubular goods according to claim 2, wherein:
   the pin-side contact surface further includes a pin-side metal seal portion and a pin-side shoulder portion; and the box-side contact surface further includes a box-side metal seal portion and a box-side shoulder portion.

4. The threaded connection for oil country tubular goods according to claim 1, wherein:
the pin-side contact surface further includes a pin-side metal seal portion and a pin-side shoulder portion; and
the box-side contact surface further includes a box-side metal seal portion and a box-side shoulder portion.

5. A method for producing a threaded connection for oil country tubular goods according to claim 1,
the threaded connection for oil country tubular goods comprising a pin having a pin-side contact surface including a pin-side threaded portion, and a box having a box-side contact surface including a box-side threaded portion,
the method comprising:
a Zn—Ni alloy plating layer formation step of immersing at least one of the pin-side contact surface and the box-side contact surface in a plating solution containing zinc ions and nickel ions, and forming a Zn—Ni alloy plating layer consisting of a Zn—Ni alloy and impurities on at least one of the pin-side contact surface and the box-side contact surface by electroplating; and
a chromate coating formation step of forming a chromate coating having a lightness L value of the surface of 45 or more and less than 65 on the Zn—Ni alloy plating layer after the Zn—Ni alloy plating layer formation step,
wherein the chromate coating formation step includes:
a chromate treatment step of immersing the pin-side contact surface and/or the box-side contact surface having the Zn—Ni alloy plating layer formed thereon in a chromating solution containing chromium ions to perform a chromate treatment; and
a drying step of performing a drying treatment on the pin-side contact surface and/or the box-side contact surface after the chromate treatment step,
wherein the chromate coating formation step satisfies one or more conditions selected from the following condition 1 to condition 3:
Condition 1: stirring speed of the chromating solution in the chromate treatment step: linear speed of 0.5 m/s or more;
Condition 2: chromate treatment time in the chromate treatment step: less than 50 seconds; and
Condition 3: drying temperature in the drying step: 60° C. or less.

6. The method for producing a threaded connection for oil country tubular goods according to claim 5, wherein:
the chromate coating formation step satisfies at least the condition 1, and
the chromate coating formation step further comprises, after the chromate treatment step and before the drying step, a non-stirring immersion step of immersing the pin-side contact surface and/or the box-side contact surface in the chromating solution for a certain time period while the stirring of the chromating solution is stopped.

7. The method for producing a threaded connection for oil country tubular goods according to claim 6, wherein:
the pin-side contact surface further includes a pin-side metal seal portion and a pin-side shoulder portion, and
the box-side contact surface further includes a box-side metal seal portion and a box-side shoulder portion.

8. The method for producing a threaded connection for oil country tubular goods according to claim 5, wherein:
the pin-side contact surface further includes a pin-side metal seal portion and a pin-side shoulder portion, and
the box-side contact surface further includes a box-side metal seal portion and a box-side shoulder portion.

* * * * *